(12) United States Patent
Fox et al.

(10) Patent No.: US 11,642,617 B2
(45) Date of Patent: May 9, 2023

(54) UNIFORMLY EXPANDABLE AIR FILTER

(71) Applicant: 3M INNOVATIVE PROPERTIES COMPANY, St. Paul, MN (US)

(72) Inventors: Andrew R. Fox, Oakdale, MN (US); Glen O. Gregerson, Hudson, WI (US); Bryan L. Gerhardt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/517,239

(22) Filed: Nov. 2, 2021

(65) Prior Publication Data
US 2022/0054968 A1    Feb. 24, 2022

Related U.S. Application Data

(63) Continuation of application No. 15/500,752, filed as application No. PCT/US2015/046497 on Aug. 24, 2015, now Pat. No. 11,192,059.

(Continued)

(51) Int. Cl.
*B01D 46/52* (2006.01)
*B01D 46/10* (2006.01)
(Continued)

(52) U.S. Cl.
CPC ....... *B01D 46/521* (2013.01); *B01D 46/0002* (2013.01); *B01D 46/0032* (2013.01); *B01D 46/10* (2013.01); *B01D 46/4227* (2013.01); *B01D 46/442* (2013.01); *B01D 46/448* (2013.01); *B01D 46/46* (2013.01); *B01D 46/523* (2013.01); *E06B 7/02* (2013.01); *E06B 7/03* (2013.01); *F24F 8/108* (2021.01); *F24F 8/158* (2021.01); *F24F 13/18* (2013.01); *F24F 13/28* (2013.01); *B01D 2265/04* (2013.01);
(Continued)

(58) Field of Classification Search
None
See application file for complete search history.

(56) References Cited

U.S. PATENT DOCUMENTS

| 1,795,087 A | 3/1931 | Higgins |
| 2,296,635 A | 9/1942 | Foehrenbach |

(Continued)

FOREIGN PATENT DOCUMENTS

| CN | 1898006 A | 1/2007 |
| CN | 201133210 | 10/2008 |

(Continued)

OTHER PUBLICATIONS

"7 Million Premature Deaths Annually Linked to Air Pollution," World Health Organization, Mar. 25, 2014 [available athttp://www.who.int/mediacentre/news/releases/2014/air-pollution/en/], 4 pages.

(Continued)

*Primary Examiner* — Christopher P Jones
*Assistant Examiner* — Brit E. Anbacht
(74) *Attorney, Agent, or Firm* — Kenneth B. Wood

(57) ABSTRACT

The present disclosure relates to air filters. More particularly, it relates to air filters including pleated filter media that can be uniformly expanded and contracted. In some embodiments, the air filters are adjustably sized air filter systems. In some embodiments, the air filters can be used in a window opening.

10 Claims, 4 Drawing Sheets

Related U.S. Application Data

(60) Provisional application No. 62/206,928, filed on Aug. 19, 2015, provisional application No. 62/041,500, filed on Aug. 25, 2014, provisional application No. 62/041,499, filed on Aug. 25, 2014, provisional application No. 62/041,496, filed on Aug. 25, 2014, provisional application No. 62/041,501, filed on Aug. 25, 2014.

(51) Int. Cl.

| | |
|---|---|
| *B01D 46/00* | (2022.01) |
| *F24F 13/18* | (2006.01) |
| *F24F 8/158* | (2021.01) |
| *F24F 8/108* | (2021.01) |
| *E06B 7/02* | (2006.01) |
| *E06B 7/03* | (2006.01) |
| *B01D 46/42* | (2006.01) |
| *F24F 13/28* | (2006.01) |
| *B01D 46/44* | (2006.01) |
| *B01D 46/46* | (2006.01) |
| *F24F 8/99* | (2021.01) |
| *F24F 8/192* | (2021.01) |

(52) U.S. Cl.
CPC .... *B01D 2275/203* (2013.01); *B01D 2279/35* (2013.01); *B01D 2279/40* (2013.01); *E06B 2007/023* (2013.01); *F24F 8/194* (2021.01); *F24F 8/99* (2021.01); *F24F 2221/20* (2013.01)

(56) References Cited

U.S. PATENT DOCUMENTS

| | | |
|---|---|---|
| 2,521,455 A | 9/1950 | Gorgun |
| 2,639,004 A | 5/1951 | McIntyre |
| 2,814,244 A | 11/1957 | Hord |
| 2,998,711 A | 9/1961 | Komroff |
| 3,364,662 A | 1/1968 | Revell |
| 3,675,402 A | 7/1972 | Weed |
| 3,695,008 A | 10/1972 | Neumann |
| 3,698,308 A | 10/1972 | Navara |
| 3,768,235 A | 10/1973 | Meyer |
| 3,826,182 A | 7/1974 | Vara |
| 3,871,851 A | 3/1975 | Neumann |
| 4,135,900 A | 1/1979 | Westlin |
| 4,773,310 A | 9/1988 | Corwin |
| 5,087,276 A | 2/1992 | Snyder |
| 5,098,767 A | 3/1992 | Linnersten |
| 5,188,646 A | 2/1993 | Nolen, Jr. |
| 5,217,513 A | 6/1993 | Armbruster |
| 5,252,111 A | 10/1993 | Spencer |
| 5,312,467 A | 5/1994 | Wolfe |
| 5,476,526 A | 12/1995 | Attermeyer |
| 5,492,551 A | 2/1996 | Wolfe |
| 5,655,825 A | 8/1997 | Anoszko |
| 5,660,605 A | 8/1997 | Chan |
| 5,792,228 A | 8/1998 | Fath |
| 5,837,022 A | 11/1998 | Chapman |
| 5,840,094 A | 11/1998 | Osendorf |
| 5,968,217 A | 10/1999 | Stein |
| 6,007,596 A | 12/1999 | Rosen |
| 6,044,892 A | 4/2000 | Epstein |
| 6,135,186 A | 10/2000 | Lindley, Jr. |
| 6,152,980 A | 11/2000 | Culwell |
| 6,193,602 B1 | 2/2001 | Aprea |
| 6,197,077 B1 | 3/2001 | Simmons |
| 6,446,696 B1 | 9/2002 | Davies |
| 6,592,643 B2 | 7/2003 | Shah |
| 6,599,343 B2 | 7/2003 | Fredrick |
| 6,638,333 B2 | 10/2003 | Schuld |
| 6,652,613 B2 | 11/2003 | Shah |
| 6,716,267 B2 | 4/2004 | Lawlor, Sr. |
| 6,740,137 B2 | 5/2004 | Kubokawa |
| 6,814,773 B2 | 11/2004 | Shah |
| 6,843,820 B2 | 1/2005 | Kubokawa |
| 6,858,297 B1 | 2/2005 | Shah |
| 6,955,702 B2 | 10/2005 | Kubokawa |
| 7,037,354 B1 | 5/2006 | Dimicelli |
| 7,077,921 B1 | 7/2006 | Dimicelli |
| 7,150,774 B2 | 12/2006 | Kubokawa |
| 7,169,202 B2 | 1/2007 | Kubokawa |
| 7,452,396 B2 | 11/2008 | Terlson |
| 7,497,888 B2 | 3/2009 | Ashwood |
| 7,622,063 B2 | 11/2009 | Sundet |
| 7,858,163 B2 | 12/2010 | Angadjivand |
| 7,947,142 B2 | 5/2011 | Fox |
| 8,157,881 B1 | 4/2012 | Anoszko |
| 8,162,153 B2 | 4/2012 | Fox |
| 8,172,919 B1 | 5/2012 | Ruiz |
| 8,371,913 B1 | 2/2013 | Taylor |
| 8,828,111 B2 | 9/2014 | Aycock |
| 9,174,159 B2 | 11/2015 | Sanocki |
| 9,278,301 B2 | 3/2016 | Fox |
| 2001/0020512 A1 | 9/2001 | Heilmann |
| 2003/0066424 A1 | 4/2003 | Shah |
| 2003/0074872 A1 | 4/2003 | Lawlor, Sr. |
| 2003/0230063 A1 | 12/2003 | Kubokawa |
| 2005/0138906 A1 | 6/2005 | Kubokawa |
| 2009/0077937 A1 | 3/2009 | Privitt |
| 2010/0326028 A1 | 12/2010 | Sundet |
| 2013/0133301 A1 | 5/2013 | Sproule et al. |
| 2015/0047507 A1 | 2/2015 | Fox |
| 2015/0047508 A1 | 2/2015 | Sanocki |
| 2017/0216756 A1 | 8/2017 | Fox |
| 2017/0252590 A1 | 9/2017 | Angadjivand |
| 2018/0021716 A1 | 1/2018 | Li |
| 2019/0217239 A1 | 7/2019 | Gregerson |
| 2020/0129907 A1 | 4/2020 | Fox |
| 2021/0229022 A1 | 7/2021 | Zhang |

FOREIGN PATENT DOCUMENTS

| | | |
|---|---|---|
| CN | 201526248 | 7/2010 |
| DE | 19846652 | 3/2000 |
| DE | 10 2010 045486 A1 | 3/2012 |
| JP | 61-74619 A | 4/1986 |
| JP | 2001-311372 | 11/2001 |
| JP | 2009-195842 A | 9/2009 |
| KR | 2007-116296 | 12/2007 |
| WO | WO 2016-032930 | 3/2016 |
| WO | WO 2016-032933 | 3/2016 |
| WO | WO 2016-032935 | 3/2016 |
| WO | WO 2016-032937 | 3/2016 |
| WO | WO 2016-069342 | 5/2016 |

OTHER PUBLICATIONS

International Search report for PCT International Application No. PCT/US2015/046497 dated Jul. 26, 2016, 3 pages.

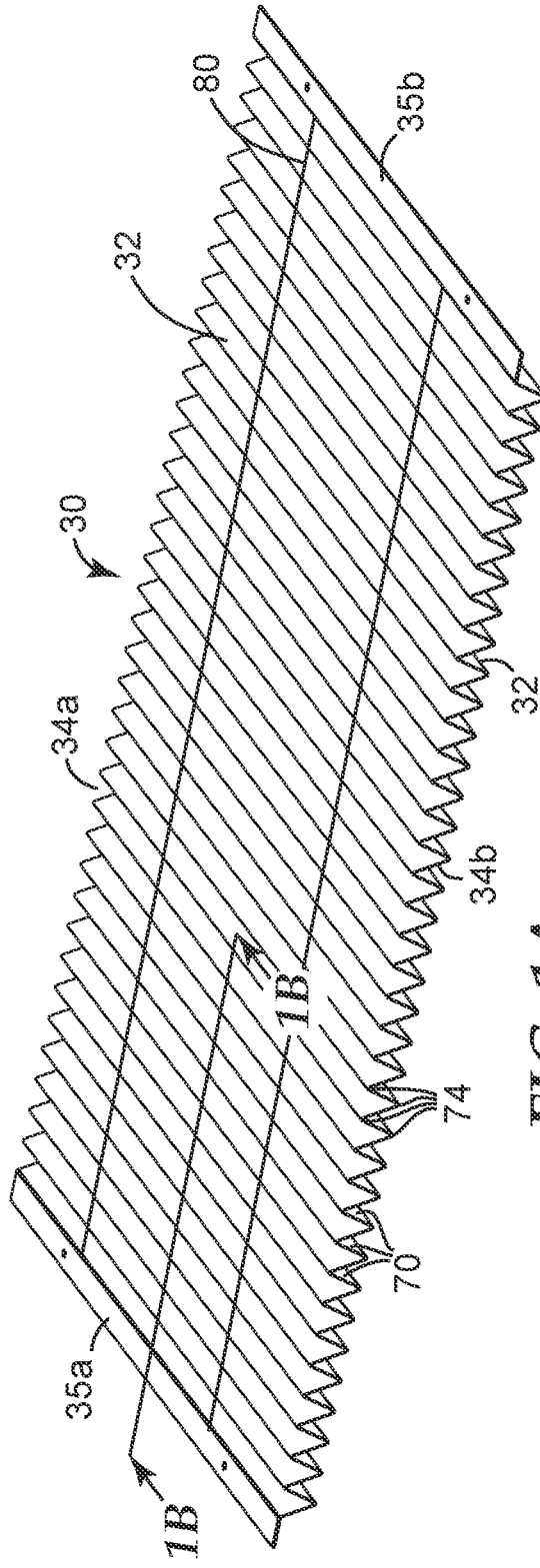
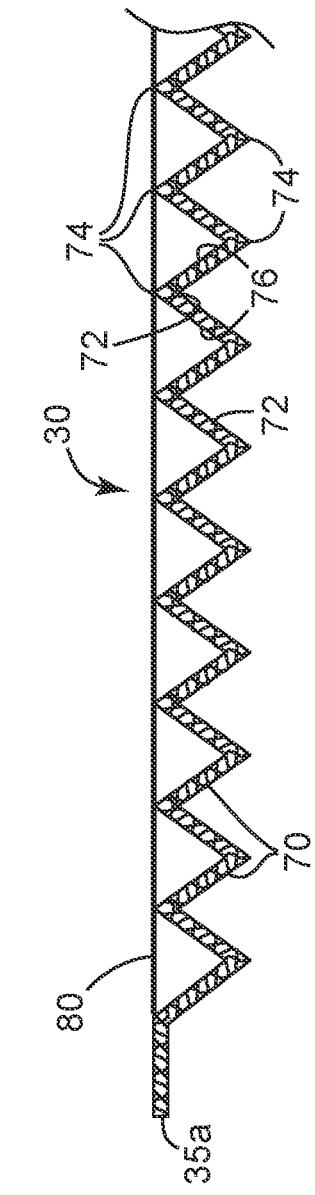
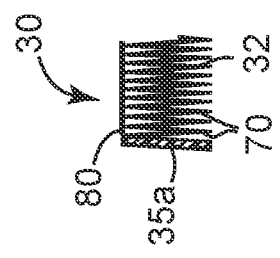
FIG. 1A
FIG. 1B
FIG. 1C

UNIFORMLY EXPANDABLE AIR FILTER

TECHNICAL FIELD

The present disclosure relates to air filters. More particularly, it relates to air filters including pleated filter media that can be uniformly expanded and contracted. In some embodiments, the air filters are adjustably sized air filter systems. In some embodiments, the air filters can be used in a window opening.

BACKGROUND

Air pollution generally relates to the introduction of matter, biological molecules, and/or other harmful materials into Earth's atmosphere. Air pollution is increasing globally. Human sensitivity to air pollution is also increasing. According to the 2014 World Health Organization report, air pollution in 2012 caused the deaths of around 7 million people worldwide. "7 *Million Premature Deaths Annually Linked to Air Pollution,*" World Health Organization, 25 Mar. 2014 (available at http://www.who.int/mediacentre/news/releases/2014/air-pollution/en/). Reducing air pollution could save millions of lives annually.

Occupants of a building structure often open their windows to let fresh air into an interior of a home, business, or otherwise enclosed space. However, in many locations, such as highly populated areas of China or India, the outside air includes high levels of air pollutants. Novel filtering solutions are needed to remove the pollution or contaminants from the air before bringing it indoors. Outdoor contaminants may include large particles such as, for example, pollen, dust, and mold spores as well as smaller particles such as, for example, $PM_{2.5}$, bacteria, and viruses. Gaseous outdoor pollutants such as, for example, odors, $NO_x$, $SO_2$, ozone, and others may also be of concern in some locations.

Some of the developments in furnace air filtration relate to making air filtration apparatuses that are expandable to fit various air duct sizes. One exemplary patent describing such air filtration devices is U.S. Pat. No. 7,037,354.

SUMMARY

The inventors of the present disclosure recognized that one disadvantage of the furnace air filters that are expandable to fit various air furnace ducts is that they do not expand uniformly. Where pleated and connected at the pleats, the connection is typically effected by non-elastic pleat-supporting materials such as, for example, metal mesh or plastic netting. As a result, the expansion amount differs significantly between adjacent pleats and/or in differing areas on the filter media. Additionally or alternatively, the above-mentioned expandable furnace filter media does not collapse uniformly. When the filter media is collapsed, the media flattens. The non-uniformity in the filter media and flattening of the filter media can result in decreased performance. Some exemplary types of decreased performance include, for example, decreased air flow, increased air pressure, and/or decreased air filtration/pollutant capture.

Given the above disadvantages, the inventors of the present disclosure also recognized a need for air filters that are uniformly expandable.

The inventors also recognized a need for air filters that are uniformly expandable for use in a window air filter or an HVAC filter.

At least some air filters of the present disclosure help protects users from outside air quality contaminants, are easily and uniformly expandable, allow fresh air get into the home or office through windows, can be easily installed and used by consumers, are versatile to fit most window sizes, and/or have minimal impact on lighting and visibility. The inventors of the present disclosure invented and discovered apparatuses and methods that address at least some of these goals. The inventors of the present disclosure invented various embodiments of air filters, methods of making air filters, and methods of using air filters.

Some embodiments of the present disclosure relate to an air filter, comprising: a filter media assembly that is expandable from a collapsed state to an expanded state and that includes pleated filter media having a plurality of pleats; and an expandable element connecting at least some of the plurality of pleats; wherein the filter media assembly expands from the collapsed state to the expanded state substantially uniformly.

In some embodiments, the air filter includes multiple expandable elements. In some embodiments, the expandable element is at least one of an elastic thread, an elastic filament, an elastic strip, an extruded elastic filament, and/or an elastic netting. In some embodiments, the expandable element is connected to at least one of all of the pleat tips of the filter media, a majority of the pleat tips of the filter media, some of the pleat tips of the filter media, adjacent pleat tips, alternating pleat tips. In some embodiments, more than one expandable element is connected to a single pleat tip. In some embodiments, the expandable elements are attached to at least one of the bottom pleat tips, the top pleat tips, and/or the top and bottom pleat tips.

In some embodiments, the filter media is at least one of moisture-resistant, moisture-repellant, electrostatically charged, an electret nonwoven web, and/or not electrostatically charged. In some embodiments, the filter media includes at least one of carbon, activated carbon, a nonwoven, a thermoplastic, a thermosetting material, a porous foam, fiberglass, paper, a high loft spunbound web, a low loft spunbound web, a meltblown web, and/or bi-modal fiber diameter meltblown media. In some embodiments, the filter media is at least one of self-supporting and non-self-supporting. In some embodiments, the air filter is at least one of a window air filter or an HVAC filter.

BRIEF DESCRIPTION OF DRAWINGS

FIG. 1A is a perspective view an exemplary pleated filter media assembly of the type generally described herein in an expanded condition.

FIG. 1B is a cross-sectional view of the pleated filter media assembly of FIG. 4A, taken along the line 1B-1B.

FIG. 1C is a side view of a portion of the pleated filter media assembly of FIG. 1A in a collapsed condition.

DETAILED DESCRIPTION

Figure 2A:
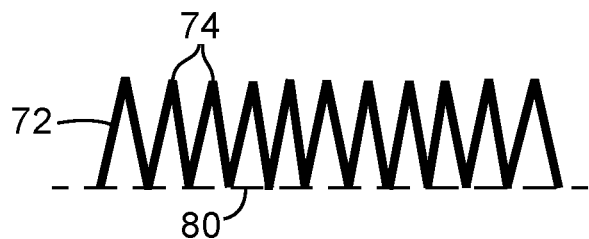
FIGS. 2A-2C are cross-sectional views of various embodiments of pleated filter media or assemblies of the type generally described herein.

Various embodiments and implementations will be described in detail. These embodiments should not be construed as limiting the scope of the present application in any manner, and changes and modifications may be made without departing from the spirit and scope of the embodiments and implementations. For example, many of the embodiments, implementations, and examples are discussed with specific reference to window air filters, but these should not be construed to limit the application scope to this one exemplary implementation. Further, only some end uses have been discussed herein, but end uses not specifically described herein are included within the scope of the present application. As such, the scope of the present application should be determined by the claims.

One embodiment of a filter media assembly 30 is shown in FIGS. 1A through 1C. The filter media 32 of the filter media assembly 30 is pleated and includes a plurality of pleats 70 each including a fold line 72 defining a pleat tip 74 and a pair of adjacent panels 76. As used herein, the term "pleated" refers to filter media at least a portion of which has been folded to form a configuration comprising rows of generally parallel, oppositely oriented folds. Each fold is referred to as a pleat. Pleats can be formed in the filter media 32 (or in the pleated filter media assembly 30) using various methods and components as are well known in the art (e.g., those described in U.S. Pat. No. 6,740,137 to Kubokawa et al., U.S. Pat. No. 7,622,063 to Sundet et al., and U.S. Patent Application No. 62/073,067, the entire teachings of each of which are incorporated herein by reference). The pleated filter media of the present disclosure can have any desired pleat spacing, size, pattern, or structure.

The pleated filter media assembly 30 also includes one or more expandable elements 80 connected, attached, adhered, bonded, etc. to at least some of the tips 74 of the pleats 70. The expandable elements 80 can be, for example, elastic threads, elastic filaments (e.g. Spandex), extruded elastic filaments, and/or an elastic netting (such as is available from Conwed) elastic strips, and/or extruded elastic strips. The expandable elements 80 can be connected to all of the pleats, some of the pleats, adjacent pleats, alternating pleats, etc. One or more expandable elements can be attached to a single pleat. In some embodiments, the expandable elements are attached to the pleat tips. In some embodiments, the expandable elements are attached to the bottom pleat tips, the top pleat tips, and/or the top and bottom pleat tips. The expandable element(s) 80 permit the filter media assembly 30 to expands from the collapsed state to the expanded state uniformly. As used herein with respect to filter media assembly 30 or filter media 32 expansion, the term "uniformly" refers to the filter media 32 or filter media assembly 32 maintaining a substantially constant distance ratio between nearby or adjacent pleat tips across the length or width of the pleated filter media or filter media assembly.

For purposes of clarity, the collapsed state, as used herein, does not require the pleats to be at a maximally compressed configuration, rather a collapsed state represents a pleat spacing which is less than the fully extended state. As such, a fully collapsed state is where the pleats are maximally compressed. In a fully collapsed state, the expandable element may be lax and the initial filter media or filter media assembly expansion may be non-uniform until the expandable element is no longer lax. Such instances are meant to fall within in the scope of the term "uniform" or "uniformly" as used herein with respect to filter media expansion.

In some embodiments, an inelastic element may be attached to the face opposite the face with the expandable elements. When the filter media or filter media assembly is expanded or is in an expanded position, the inelastic element can provide a "dead stop" at a maximum expansion position.

The expandable element(s) 80 can be connected, attached, adhered, bonded to the pleat tips 80 by any known or desired method. Some exemplary attachment methods include, for example, extrusion of one or more expandable elements directly or indirectly onto the pleat tips, attachment of pre-formed expandable materials through thermal bonding, chemical bonding, ultrasonic bonding, pressure bonding, use of adhesives (including, for example, hot melt adhesives), etc. The expandable element(s) may be attached under a variety of conditions, including conditions where the expandable or elastic elements are under zero or very little extension to where the expandable or elastic elements are attached to the pleats tips while under considerable extension.

In some embodiments, the expandable element(s) is/are applied under low to zero extension. In some embodiments, the expandable element(s) is/are applied when the filter assembly or filter media is at 10% of maximum expansion or less. In some embodiments, the expandable element(s) is/are applied under high or considerable extension. In some embodiments, the expandable element(s) is/are applied when the filter assembly or filter media is at 30% of maximum expansion or more.

The pleated filter media assemblies of the present disclosure can have any desired shape, including, for example, the quadrilateral or rectangular shape (the term "rectangular" being specifically inclusive of a square shape) shown, defining opposing sides 34a, 34b and opposing ends 35a, 35b.

In some embodiments, the filter media assembly 30 can at least be transitioned from the collapsed condition to the expanded condition without damaging a structural integrity of the filter media assembly 30. In some embodiments, the filter media assembly 30 can be repeatedly transitioned between the collapsed and expanded conditions without damaging a structural integrity of the filter media assembly 30.

The pleated filter media assemblies of the present disclosure can consist of the filter media or web 32 alone or can include one or more additional components or structures applied or assembled to the filter media 32.

The pleated filter media 32 of the assembly 30 can be self-supporting or non-self-supporting. As used herein, the term "self-supporting filter media or web" can describe at least one of the following conditions: (1) a filter media or web that is deformation resistant without requiring stiffening layers, adhesive or other reinforcement in the filter media web; or (2) the filter media generally maintains its shape when subjected to an airstream as described, for example, in U.S. Pat. No. 7,169,202 to Kubokawa, the entire teachings of which are incorporated herein by reference; or (3) a web or media having sufficient coherency and strength so as to be drapable and handleable without substantial tearing or rupture. As used herein, the term "non-self-supporting" describes an air filter media that is not capable, in the absence of a support frame and/or a support grill, of withstanding the forces encountered due to typical air flow.

In some embodiments, where the pleated filter media assembly 30 consists of the pleated filter media 32 alone, the pleated filter media or web 32 can be self-supporting or non-self-supporting. In some embodiments, where the pleated filter media assembly 30 consists of the pleated filter media or web 32 and a support structure, the pleated filter media 32 can be non-self-supporting with the addition supporting structure rendering the pleated filter media assembly 30, as a whole, to be self-supporting. In some embodiments, the pleated filter media 32 is wire-backed.

Figure 2B:
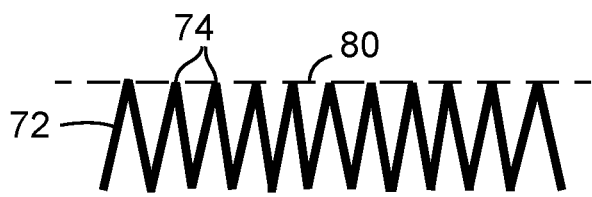
Figure 2C:
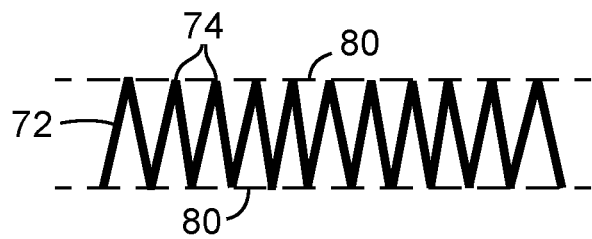

FIGS. 2A-2C illustrate various examples of pleated filter media that can be employed with the adjustable air filter 20. In some embodiments, the pleated filter media is uniformly expandable. In some embodiments, the pleated filter media is uniformly expandable in at least one direction corresponding to a major axis. FIG. 2A illustrates an exemplary embodiment in which the expandable element 80 is attached to adjacent "bottom" pleat tips. FIG. 2B illustrates an exemplary embodiment in which the expandable element 80 is attached to adjacent "top" pleat tips. FIG. 2CB illustrates an exemplary embodiment in which the expandable element 80 is attached to adjacent "top" and "bottom" pleat tips.

In some embodiments, the expandable element(s) attached to the pleat tips may have different properties in the two major axis directions. For example, strands, filaments, or strips will provide elastic properties in only a single direction. A netting may provide elasticity in one or more axial directions. In some embodiments, the properties of a netting may vary in the two axial directions, and the cross-direction may be inelastic while the primary axis may be elastic.

The particular filter media 32 selected for the filter media assembly 30 can be particularly suited have any of the particular desired characteristics known or described herein. In some embodiments, the filter media assembly 30 is constructed from moisture-resistant materials. In some embodiments, the filter media may include additional layers or features to specifically block or repel water, such as rain.

In some embodiments, an electrostatic charge is optionally imparted into or onto material(s) of the filter media 32. In some embodiments, an electrostatically charged media 32 may be used, of which many grades are available, and many of which offer high efficiency with low pressure drop. By incorporating an extended surface area and by covering moderate portion of the window, in combination with using a low pressure drop web enabled by the electrostatic charging, a reasonably low pressure drop can be achieved for the filter, which may help provide moderate airflow through the filter. In some embodiments, the filter media 32 can be an electret nonwoven web. Electric charge can be imparted to the filter media 32 in a variety of ways as is well known in the art, for example by hydrocharging, corona charging, etc. (e.g., as described in U.S. Pat. No. 7,947,142, the entirety of which is incorporated by reference herein).

In other embodiments, the filter media 32 is not electrostatically charged. In some embodiments, additional multifunctional media grades, which incorporate activated carbon or other materials for purifying gas-phase pollutants, may also or alternatively be incorporated into the filter structure. In some embodiments, the filter media 32 can be constructed, for example, from nonwoven fibrous media formed of thermoplastics or thermosetting materials such as polypropylene, linear polyethylene and polyvinyl chloride. Other suitable, non-limiting materials for the filter media include porous foams, nonwovens, papers, fiberglass, or the like. In some embodiments, the filter media 32 comprises a filter media that attracts and captures dust, allergens (such as pollen and mold spores), and/or fine particle pollution from the outdoor air.

Nonwoven webs useful with the filter media 32 can be a high loft spunbond webs, such as described, for example, in U.S. Pat. No. 8,162,153 to Fox et al., the entirety of which is incorporated herein. In other embodiments, the filter media 32 can be a low loft spunbond web, such as is described in U.S. Pat. No. 7,947,142 to Fox et al., the entirety of which is incorporated herein. In yet other embodiments, nonwoven webs useful with the filter media 32 are generated by other techniques and/or have other characteristics, such as the meltblown nonwoven webs disclosed in U.S. Pat. No. 6,858,297 to Shah et al., the entirety of which is incorporated herein. Other non-limiting example of useful nonwoven web formats include bi-modal fiber diameter meltblown media such as those described in U.S. Pat. No. 7,858,163, the entirety of which is incorporated herein.

In some embodiments, the filter media 32 is an electrostatically charged nonwoven type of media. In some embodiments, the filter media 32 can be a pleated filter media including at least a portion that has been folded to form a configuration comprising rows of generally parallel, oppositely oriented folds. In some embodiments, pleats can be formed in the filter media 32 (or in the pleated filter media assembly 30) using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

In some embodiments, the expandable and collapsible air filters are useful in protecting users from air quality contaminants.

Figure 3A:
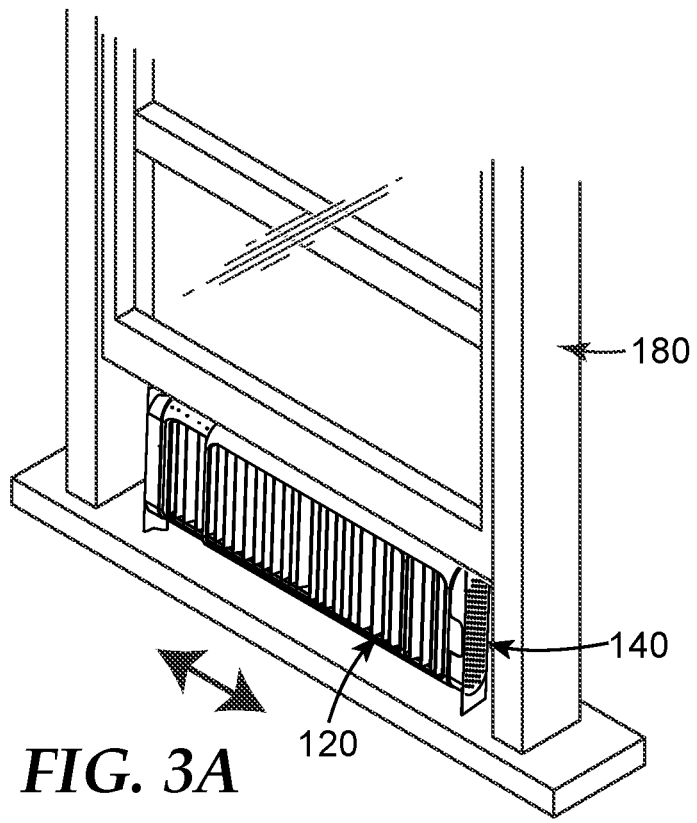
FIGS. 3A-3B are perspective views of an exemplary air filter of the type generally described herein for use in a vertically opening window.
Figure 3B:
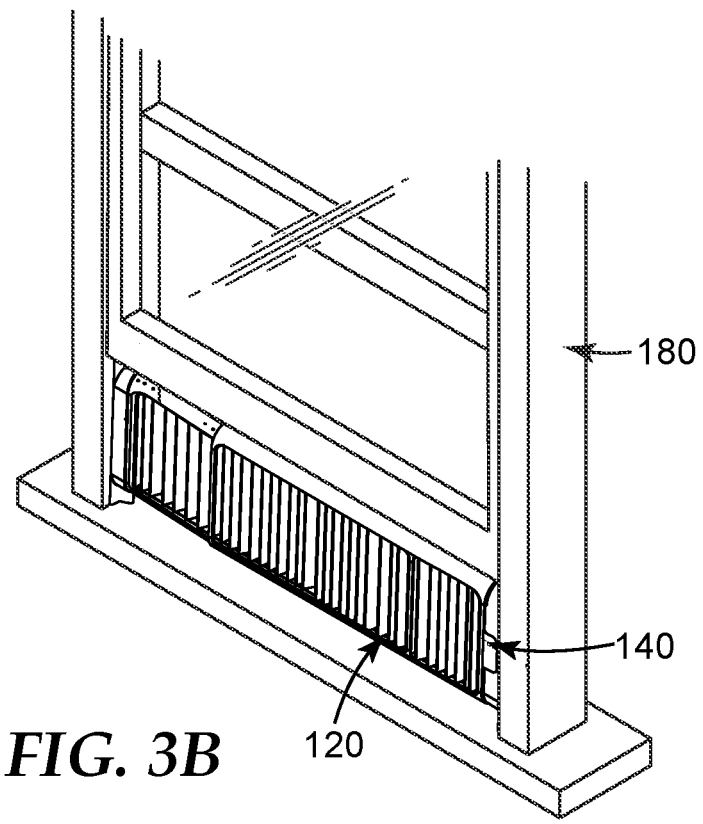

FIGS. 3A-3C illustrate aspects of the materials and construction of an exemplary retractable filter 120 installed in a sliding-type window 180, which can be either single or double hung. Sliding windows are predominant in North America and China. Attachment of the retractable filter 120 to a window 180 may be either permanent or semi-permanent. In some embodiments, an attachment mechanism provides secure holding of the retractable filter 120 to the window 180 because the attachment point may undergo moderate stress from the inner spring forces as the filter media assembly is extended and retracted. Some exemplary permanent fixation options include nails, screws, and certain types of adhesives. In some embodiments, the attachment is semi-permanent, such as using Command™ strips, adhesively backed interlocking hooks, rare earth magnets, etc. When expanded, the side edges of the filter media assembly 130 can be attached to the window frame/sill members with mechanical or adhesive components. In some embodiments, the expandable filter frame also contains means for locking the expandable frame in position due to the same contraction forces.

Figure 4A:
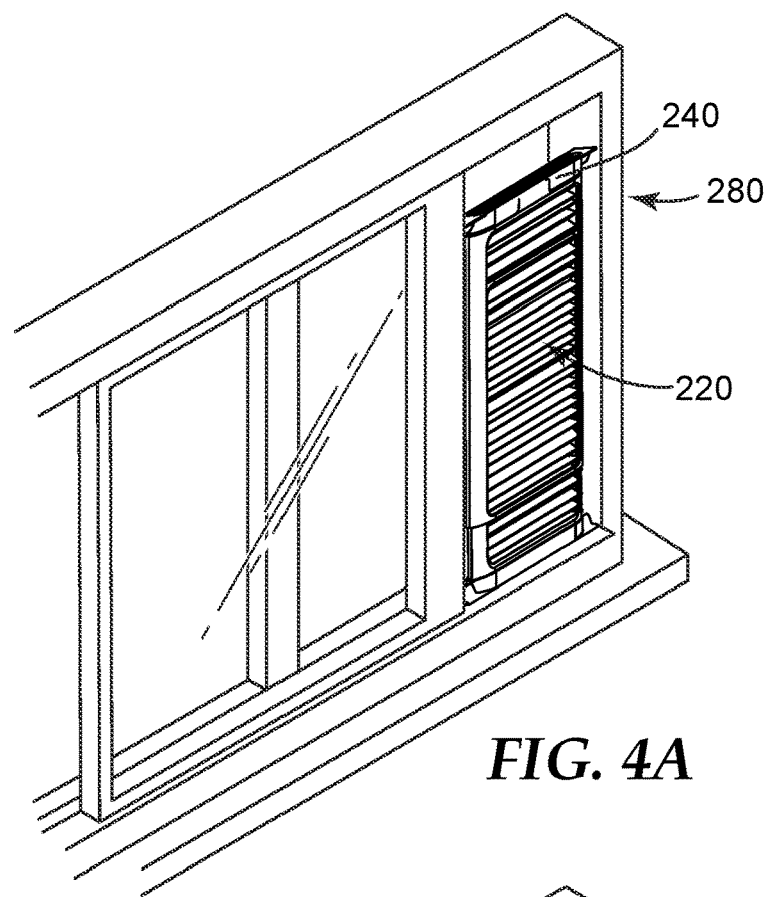
FIGS. 4A-4B are perspective views of an exemplary air filter of the type generally described herein installed in a horizontally opening window.
Figure 4B:
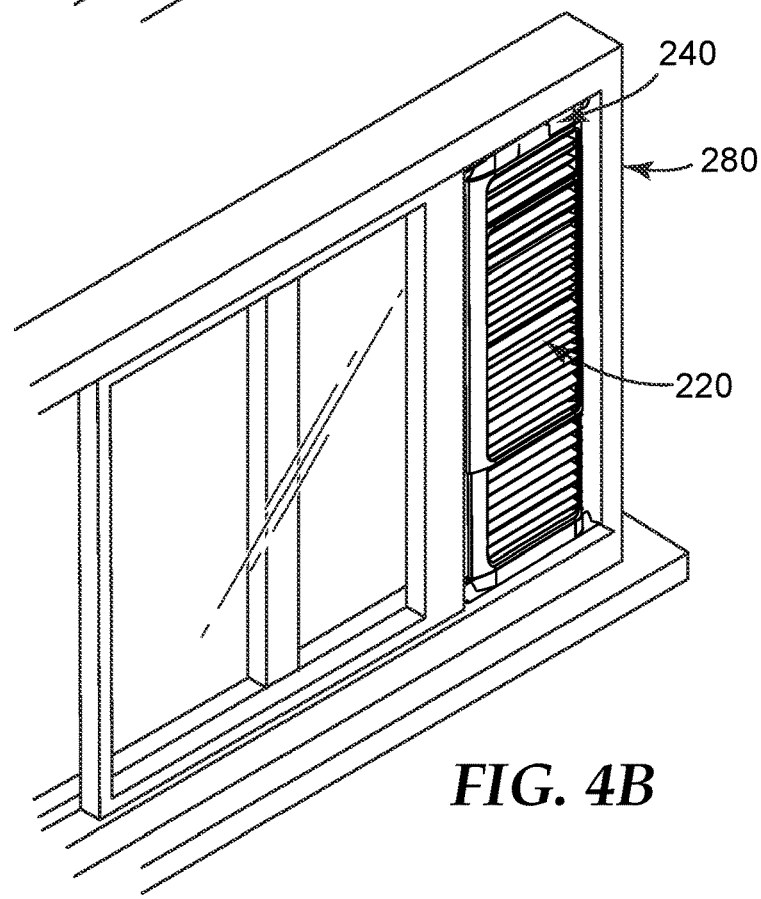

Finally, similar to the vertical sliding window 180 of FIGS. 3A-3C discussed above, FIGS. 4A and 4B illustrate an exemplary collapsible and expandable air filter 220 installed in a horizontal sliding window 280. In some embodiments, the retractable filter 220 is attached at one end of the window 280, the window 280 is partially opened, and the filter media assembly 230 is expanded to cover the window gap. A small gap may be created between the two window segments, allowing air to flow from the outside between the two window segments and bypassing the filter media assembly 230 to gain entry to the indoors. In some embodiments, this bypass may be avoided by the use of a piece of foam, weather-stripping, etc. (not shown).

The air filters of the present disclosure can be placed in any desired frame or housing. Some exemplary frames are described in, for example, U.S. Patent Application No. 62/041,496 and 62/041,499, both of which are incorporated in their entirety herein. The air filter assembly of the present disclosure can be used in a powered air filtration system such as, for example, that described in U.S. Patent Application No. 62/041,501, incorporated herein in its entirety. The air filter media can come in roll form, such as, for example, that described in U.S. Patent Application No. 62/041,500, the entirety of which is incorporated herein.

The air filters described herein can be used in any desired application including, but not limited to, windows or HVAC systems.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

All references mentioned herein are incorporated in their entirety.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. An air filter, comprising:
   a self-supporting filter media assembly that is expandable from a collapsed state to an expanded state and that includes a self-supporting pleated filter media having a plurality of pleats; and
   multiple elastic, expandable elements connected to a majority of the pleat tips of the plurality of pleats;
   wherein the multiple elastic, expandable elements consist of a set of extruded elastic filaments that are extruded onto the pleat tips and are thermally bonded thereto and wherein the extruded elastic filaments are all linear and parallel to each other at least when the self-supporting filter media assembly is in an expanded state,
   wherein the self-supporting filter media assembly expands from the collapsed state to the expanded state substantially uniformly,
   and wherein the set of extruded elastic filaments is provided on a first face of the pleated filter media and wherein one or more inelastic elements are attached to a second, opposing face of the pleated filter media and wherein the one or more inelastic elements provide a dead stop at a maximally expanded state of the pleated filter media.

2. The air filter of claim 1, wherein more than one of the multiple elastic, expandable elements are connected to a single pleat tip.

3. The air filter of claim 1, wherein the multiple, elastic expandable elements are attached to at least one of the bottom pleat tips, the top pleat tips, or the top and bottom pleat tips.

4. The air filter of claim 1, wherein the self-supporting filter media is at least one of moisture-resistant, moisture-repellant, electrostatically charged, an electret nonwoven web, or not electrostatically charged.

5. The air filter of claim 1, wherein the self-supporting pleated filter media includes at least one of carbon, activated carbon, a nonwoven, a thermoplastic, a thermosetting material, a porous foam, fiberglass, paper, a high loft spunbond web, a low loft spunbond web, a meltblown web, or bi-modal fiber diameter meltblown media.

6. The air filter of claim 1, wherein the air filter is at least one of a window air filter or an HVAC filter.

7. The air filter of claim 1, wherein when the self-supporting pleated filter media is in the expanded state, the set of extruded elastic filaments collectively form a planar configuration.

8. The air filter of claim 1 wherein the set of extruded elastic filaments provide elastic properties only in a single direction.

9. The air filter of claim 1 wherein the air filter is in the form of a roll.

10. The air filter of claim 1 wherein the self-supporting pleated filter media is an electrostatically charged nonwoven filter media.

* * * * *